(12) United States Patent
Tietbohl Toigo

(10) Patent No.: US 12,344,211 B2
(45) Date of Patent: Jul. 1, 2025

(54) CENTRALIZED COOLING SYSTEM FOR VEHICLE BRAKES, WHEELS, TIRES AND BEARINGS

(71) Applicant: TOIGO IMPORTADORA E DISTRIBUIDORA DE SISTEMAS AUTOMOTIVOS LTDA., Caxias do Sul (BR)

(72) Inventor: Frederico Tietbohl Toigo, Caxias do Sul (BR)

(73) Assignee: TOIGO IMPORTADORA E DISTRIBUIDORA DE SISTEMAS AUTOMOTIVOS LTDA., Caxias Do Sul (BR)

( * ) Notice: Subject to any disclaimer, the term of this patent is extended or adjusted under 35 U.S.C. 154(b) by 509 days.

(21) Appl. No.: 17/630,445

(22) PCT Filed: Jul. 24, 2020

(86) PCT No.: PCT/BR2020/050287
§ 371 (c)(1),
(2) Date: Jan. 26, 2022

(87) PCT Pub. No.: WO2021/016692
PCT Pub. Date: Feb. 4, 2021

(65) Prior Publication Data
US 2022/0250605 A1    Aug. 11, 2022

(30) Foreign Application Priority Data
Aug. 1, 2019  (BR) .......................... 1020190159308

(51) Int. Cl.
*B60T 17/22*    (2006.01)
*B60T 5/00*    (2006.01)
(Continued)

(52) U.S. Cl.
CPC ................. *B60T 17/22* (2013.01); *B60T 5/00* (2013.01); *F16D 65/847* (2013.01); *F16D 2066/001* (2013.01)

(58) Field of Classification Search
CPC .......... B60T 17/22; B60T 5/00; F16D 65/847; F16D 65/827; F16D 2065/783; F16D 2066/001; F01P 7/02
See application file for complete search history.

(56) References Cited

U.S. PATENT DOCUMENTS

2010/0258385 A1* 10/2010 Sabelstrom ............. B60T 13/26
                                                                188/71.6

FOREIGN PATENT DOCUMENTS

BR    PI1106691 A2    8/2013
BR    PI0722350 A2    3/2014
(Continued)

OTHER PUBLICATIONS

Chinese Patent No. CN 201895566 to Li et al published on Jul. 13, 2011.*
(Continued)

*Primary Examiner* — Pamela Rodriguez
(74) *Attorney, Agent, or Firm* — LOZA & LOZA, LLP; Kevin L. Soules

(57) ABSTRACT

The invention comprises a centralized cooling system for motorized vehicle's brakes, wheels, tires, and bearings, controlled by a Central ECU Module. The system uses one or more fans, preferably brushless, intelligently managed by the Central ECU Module, fixed to the chassis or unibody of the vehicle and connected to forced air outlet ducts, so that the air is channeled directly to the wheel hubs of the vehicle's axles. The system uses, individually or together, through the collection and processing of data by the Central ECU Module, several technical information collected by the (Continued)

vehicle's peripherals, so that it manages the use of the brake cooling system fans intelligently, in relation to the potency applied, the duration the fan is on when the vehicle is turned on and the duration the fan is on when the vehicle is turned off.

15 Claims, 2 Drawing Sheets

(51) Int. Cl.
  *F16D 65/847* (2006.01)
  *F16D 66/00* (2006.01)

(56) References Cited

FOREIGN PATENT DOCUMENTS

| BR | P10914451 A2 | 1/2018 |
| BR | 112017021314 A1 | 6/2018 |
| BR | 2020160295047 U | 7/2018 |
| CN | 210734118 U | 6/2020 |
| CN | 210978309 U | 7/2020 |
| JP | 2005178427 A | 7/2005 |
| RU | 198449 U1 | 7/2020 |
| WO | 2017121741 A1 | 7/2017 |

OTHER PUBLICATIONS

Chinese Patent No. CN 202783163 to Rui et al published on Mar. 13, 2013.*

Chinese Patent No. CN 108128290 to Xiong published on Jun. 8, 2018.*

PCT/BR2020/050287. International Search Report & Written Opinion (Nov. 11, 2020).

* cited by examiner

CENTRALIZED COOLING SYSTEM FOR VEHICLE BRAKES, WHEELS, TIRES AND BEARINGS

FIELD OF INVENTION

The present invention concerns a centralized cooling system for motorized vehicle's brakes, wheels, tires, and bearings, controlled by a Central ECU Module, which can be used in light and heavy vehicles, tractors, dollies, semi-trailers and trailers, trains, among others similar.

BACKGROUND OF THE INVENTION AND CHARACTERISTICS OF THE PRESENT INVENTION

The temperature of brake shoes, pads, drum, and discs, tires and bearings is directly affected by several factors, including the application of the brakes in the vehicle's running, braking force, vehicle speed, G force, duration of the braking, the terrain relief, air temperature and the air flow that passes under the vehicle.

All these factors influence the increase in the temperature of the vehicle's running and braking components. It was realized that these factors, and the information pertaining to them, were not used by existing state-of-the-art cooling systems, since they could directly affect the operation and improved use of such systems.

Braking generates heat to the brakes, which in turn conduct the heat to other parts of the axle, such as the axle's end tip, drum, disc, brake pad, brake shoe, brake hub, bearing, wheel(s) and tire(s). This occurs through the three thermodynamic processes of heat release: radiation, conduction, and convection.

The heat generating sources in a tire are: speed, weight incident on the tire, correct calibration for the weight, tread design according to the type of terrain, position in the vehicle, tread chemical mixture and quality of the tire compound, as well as the use of the brakes. This last element is the only one that can be worked on for cooling, considering the correct calibration of the tires, which is one of the objects of the cooling system described herein.

The heat generated by the friction of the brake pads to the discs or from the brake shoes to the drums (which can vary from 200° C. to 800° C.) is transferred to the sockets, sleeves, wheel hubs, bearings and to the wheels themselves, which in turn transfer this heat to the tires, either by thermal conduction through the bead; by convection of hot air, which passes through the drum or disc; by radiation from the contact track; friction of the disc/pad or drum/shoe assembly, directly to the tires and bearings.

It is known that temperatures above 80° C. are extremely harmful to tires, generating effects such as blisters, cracks, and bakelization, turning rubber into bakelite, causing irreparable damage to the tread, bead, sidewall and carcass of the tire, and is one of the main causes of tire losses in fleets. These consequences prevent the use of tires until the end of their useful life (whether new or in the first, second and even third retreading), which end up being discarded due to leaks generated by cracks in the parts that were bakelized by excessive heat. This fact causes enormous damage to fleets and end users, affecting 60% to 80% of scrapped tires, preventing them from being recapped and, therefore, forcing fleets and end users to purchase new tires at a higher cost, when they could be using retreaded tires (at half or even a quarter of the cost), generating great financial waste, as well as great environmental pollution.

At lower temperatures (from 30° C. to 80° C.), tires can have a better kilometer yield, estimating an extension between 1% and 10% than when running at high temperatures (from 80° C. to 120° C.).

Vehicle brakes work at temperatures between 180° C. and 850° C., which directly influences the durability of brake shoes, pads, drums, and discs. As with tires, brakes can even double their useful life, as long as they work in milder temperatures, which also increases the safety of the system on mountainous and winding stretches, by keeping the brakes for a longer time in the ideal temperature condition, besides delaying their failure (temperature fading).

This cooling system also cleans shoes, pads, and soot residues, which build up on the drum or discs, thus allowing reduced heat accumulation. These improvements bring huge savings for end users of vehicles and transport companies.

In addition to saving components such as tires, brake systems, and bearings, this system allows for greater safety and shorter braking distances, by ensuring that the brake has a higher coefficient of friction for a longer period of time, due to the lower average temperature in the friction material's contact lane, as well as a longer maximum braking capacity time and reduced fading, and reduced or delayed brake overheating (which can lead to major accidents and vehicle fires due to spontaneous ignition). Furthermore, the present system helps to reduce braking distances, which brings safety improvements to the user.

The present system, unlike other existing cooling systems, allows its operation even when the vehicle is stopped and with the key turned off, and this is precisely the moment when tire temperatures become higher, as the entire flow of vehicle air is ceased due to static and the fact that electrical systems usually run with the vehicle key turned on (so the alternator generates voltage and current to charge the battery).

With the key turned off and soon after arriving from a trip or journey, the vehicle will have a large amount of energy accumulated in the brakes, which tends to disperse to the wheels and tires and, at that time, with the vehicle stopped and no air flow ventilation that passes under the moving vehicle, is that temperatures become higher, damaging the tire bead (the only area of the tire in direct contact with the vehicle wheel). The present system, by allowing operation even with the vehicle turned off, solves this existing technical problem.

Another important factor that contributes to the increase in temperature is the human factor, related to how the driver/operator drives the vehicle. Factors such as average speed, traffic flow, vehicle weight (PBT) and terrain relief (uphills/downhills), as well as the G force applied to the braking and activation time, are different reasons for heating the set of brakes, tires, wheels, etc. The present system also contributes to the reduction of these factors, as it allows to monitor and store the information of the G Force applied to the vehicle's brakes, so that the cooling system can automatically adapt to such factors, changing the times of system utilization and intensities, increasing its efficiency in order to reduce temperatures and optimize the useful life of the cooling system.

Another differential of the present system in relation to the state of the art is the use of brushless fans, with IP69 protection and current control. Fans or turbines that use brushes have a durability of 2 to 6 months, this period being considered a very short useful life for application in vehicle cooling systems, as they require constant changes and maintenance, making their use too costly and, in the end, impracticable.

Likewise, the use of thermocouples makes the equipment more expensive and difficult to install, with more items to be installed and susceptible to failure. Systems that use thermocouples also have the disadvantage of only working from a certain temperature, generating a significant heat source in the brake systems; moreover, it increases the difficulty of measuring, calibrating, and adjusting, due to the numerous variables such as, for example, the type of terrain, climate, human factor (driver), vehicle model, among others, which results in lower system efficiency.

Current systems do not communicate or are interconnected with TPMS (Tyre Pressure Monitoring System) systems of the vehicle(s), which monitor the pressure and temperature of tires. The present system can be interconnected to the vehicle's TPMS systems, in order to detect the monitored temperatures and thus control the operating times, the applied power and the operation of the system's fans.

The present system also allows the reading of CAN BUS (J1939) network parameters, capturing information directly from the vehicle's ECU Module, such as: brake light activations, speeds, tire temperature conditions, air temperature, battery level status and ignition status. Reading this information allows the system to intelligently and centrally control the operation of the fans, their activation time and potency, according to the variation in such information.

In this way, the system described herein, unlike the current systems in the state of the art, allows the automatic detection of a mountain range descent or an emergency, activating itself automatically and changing its parameterization according to the descent time and the number of brake activations of the vehicle. Likewise, the system can be activated manually by the driver/operator.

The system also has a room temperature sensor directly in the Central ECU Module, which detects when temperatures are too low, to delay and/or prevent the system from operating in very cold climates, favoring the heating of the brakes and tires in this type of condition (which, in this case, is desirable).

Other differentials of this system include the use of air inlet and outlet directed to brakes on the drum/discs and on the sides of the vehicle to capture cold air, as well as reading the levels of the battery and/or the vehicle's alternator, in order to detect if they are in full condition to power the system fans.

It should be noted that vehicles with air conditioning have two alternators or one alternator with a higher capacity, while vehicles without air conditioning have only one alternator with a lower capacity. Regardless of the vehicle model, the present invention provides for the use of a power system (alternators) in parallel or dedicated, with or without extra batteries, by the cardan shaft of the tractor vehicle and which can be taken to the towed vehicle using a trailer connector, supplying power to the fans.

The present invention is activated by a direct operation button at maximum power, while the vehicle is on; and an off button, for the total non-operation of the system.

The present system also allows the reading of the parameters of different modules simultaneously or individually by the Central ECU Module, to implement the information: a) of the CAN BUS network (J1939) for analysis of the brake light activation parameters, speeds, tire temperature conditions, air temperature, battery level, ignition status; b) of the TPMS, in order to detect the temperatures monitored by that system; c) of the 3 (three) axle accelerometers of the vehicle, in order to detect, for example, the occurrence of strong braking, or even if the vehicle is on a slope/uphill or in a straight line; d) of the use of the vehicle's traffic lights and brake light, by the ground or the positive signals from the brake light, to monitor its time of use and the amount, time, and form of use of the brakes, thus counting the amount of brakings and the time of each braking; e) of the battery level, alternator operation and vehicle ignition status to define fan times and operating potency; f) of the activation of the driver's button to activate the fan continuously and at maximum potency; activation by the module's operating logic; by the fact that the vehicle is turned off; or even by the room temperature.

The use of all this information, in a centralized and intelligent way by the system's Central ECU Module is the great difference in relation to other cooling systems found in the state of the art.

In short, the present invention has several differences in relation to current cooling systems, solving several existing technical problems.

DETAILED DESCRIPTION OF THE INVENTION

System Overview

The present invention concerns a centralized cooling system for motorized vehicle's brakes, wheels, tires, and bearings, controlled by a Central ECU Module(1), which can be used in light and heavy vehicles, tractors, dollys, semi-trailers, and trailers, trains, among others similar.

The system uses one or more Fan(s)(6), preferably brushless and equipped with IP69 protection and current control by RPM, intelligently managed by the Central ECU Module (1), fixed to the chassis or to the vehicle's unibody and connected to nacas and forced air outlet ducts(12), so that the air is channeled directly to the wheel hubs of the vehicle axles.

The system allows to cool between 1° C. to 40° C. the peak temperature of the tires, as well as their average temperatures in the same proportion. It also allows cooling from 1° C. to 150° C. at the peak temperatures of the shoes/pads and from 1° C. to 150° C. at the peak temperatures of the drum/discs.

The system uses, individually or together, through the collection and processing of data by the Central ECU Module(1), information on: room temperature, an Inclinometer for longitudinal and horizontal measurement, 3-axis (X, Y, and Z) accelerometer (G force), ECU Module of the Vehicle information(13) through CAN BUS network (J1939), system on/off button by the driver, Vehicle Battery voltage level reading(5), ignition key status detection of the vehicle(3), tire pressure and temperature by the TPMS Module(2) or by the ECU Module of the Vehicle(13), detection of activation and activation time of the ground signal or the positive signal of the Signal/Brake light(4) and preparing the system for operation with the vehicle turned off.

The information collected by the system is used to feed the Central ECU Module(1), so that it manages the use of the brake cooling system fans in an intelligent way, in relation to the potency applied to the system, the duration of the fan in use with the vehicle turned on, and the duration of the fan in use with the vehicle turned off.

Detailed System Operation

Figure 1:
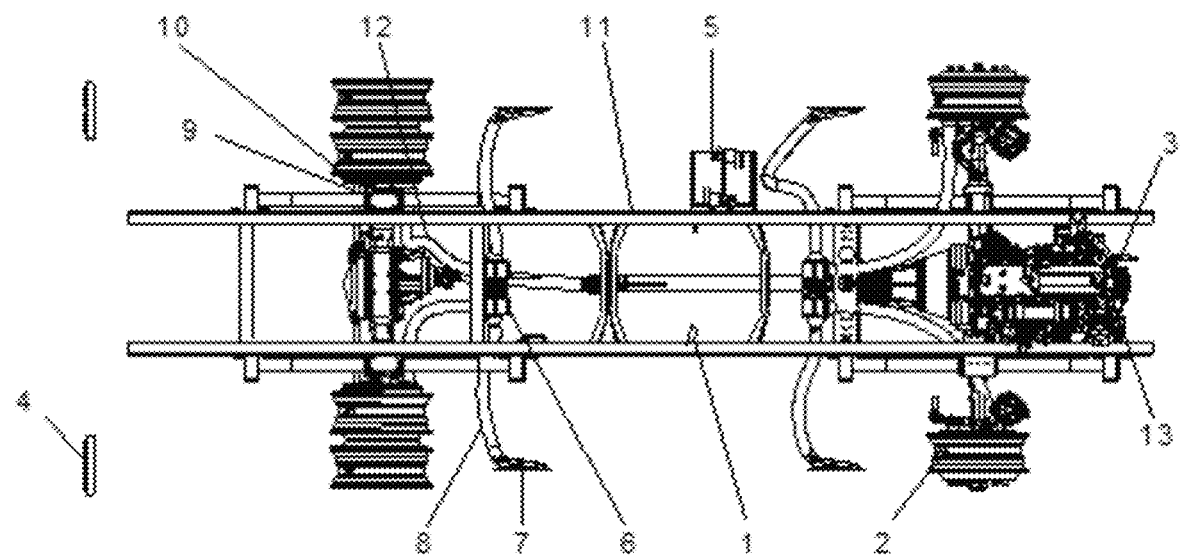
FIG. 1 shows a schematic representation of the cooling system for vehicle brakes, wheels, tires and bearings, with their respective references:
 (1) Central ECU Module;
 (2) A TPMS module;
 (3) A vehicle ignition key;
 (4) Signal/Brake Lights;
 (5) The battery of the vehicle;
 (6) Fan(s);
 (7) External air catcher;
 (8) Air inlet duct;
 (9) Cold air inlet flange;
 (10) Hot air outlet flange;
 (11) Auxiliary alternator;
 (12) Forced air outlet duct;
 (13) ECU Module of the Vehicle.
Figure 2:
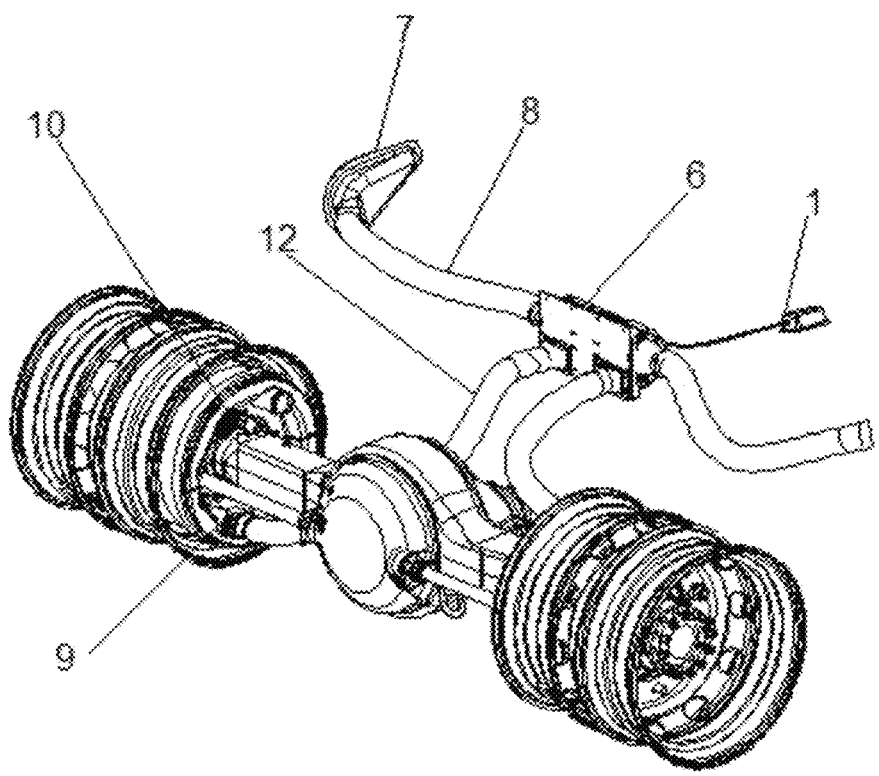
FIG. 2 presents a detailed view of the vehicle's brakes, wheels, tires and bearings cooling system, with their respective references as described in FIG. 1, in detail on a single vehicle axle.
Figure 3:
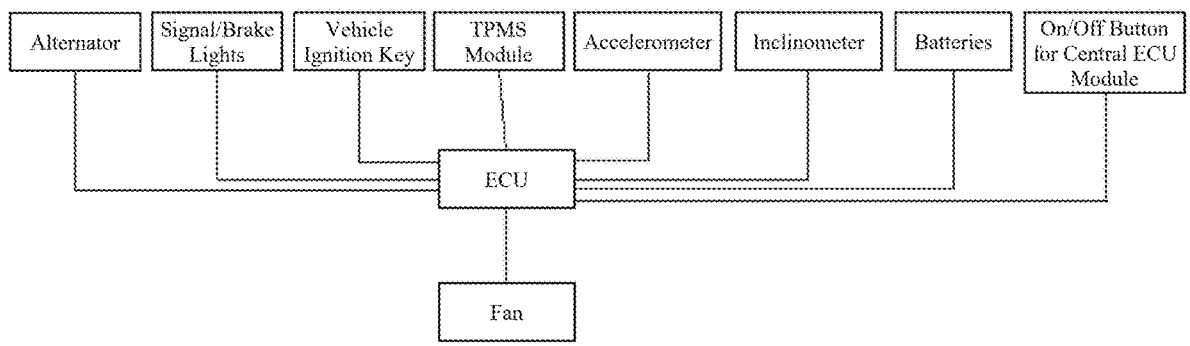
FIG. 3 presents a flowchart of system operations, with the centralization of information for operation in the Central ECU Module.

FIG. 3 demonstrates the flowchart of the system's functioning, using the references contained in FIG. 1 for a better presentation of the functioning.

The system works with the Central ECU Module(1), which will always be connected to the Vehicle Battery(5) and to the original alternator(s) or to the Auxiliary Alternator (11) of the vehicle. Optionally, the system can be connected to at least one of the other modules or peripherals already described, such as the Signal/Brake light(4), the vehicle ignition key(3), the ECU Module of the Vehicle(13) through the CAN BUS Network J1939, the TPMS Module(2), the Inclinometer and the Accelerometer, in order to further optimize its operation and, consequently, have a better performance in its use and increase the lifespan of the components, since all the information collected from these modules or peripherals is treated and intelligently used by the Central ECU Module(1) to control the use of the system's Fan(s)(6).

The Central ECU Module(1) communicates with all other modules or original vehicle peripherals through the connection of the vehicle's pre-existing wire harness or a dedicated wire harness of the Central ECU Module(1), thus reading the information of the vehicle's said modules or peripherals.

The Central ECU Module(1) controls the entire system operation, by reading and using the information collected from the accessory modules, detailing below what each of these accessory modules contributes to the system.

Regarding the Vehicle Battery(5) and the original alternator or Auxiliary Alternator(11) of the vehicle, it should be noted that these are the two accessories that will always be used by the system to allow its correct and basic operation. The system collects information on voltage, current and whether the vehicle is turned on or off. The Central ECU Module(1) receives and parameterizes such information to define the operating mode, duration and potency of the Fan(s)(6).

Regarding the Signal/Brake lights(4), these inform the vehicle's operating status (if turned on or off), the brake activation duration and the amount of activations over time, after starting the vehicle. The Central ECU Module(1) receives and parameterizes such information to define the operating mode, duration and potency of the Fan(s)(6).

Regarding the vehicle's ignition key(3), it checks and confirms, in addition to the Battery(5) and Alternator(11) information, whether the driver or operator has the vehicle turned on or not.

Regarding the On/Off Button of the Central ECU Module (1), it checks and informs whether the driver or operator has activated the manual on/off switch of the system, for the operation or not of the Fan(s)(6), ensuring a continuous activation of the fan(s) until the key is turned off or the vehicle power supply is cut. The Central ECU Module(1) receives and parameterizes such information to define the operation or not of the Fan(s)(6).

The Central ECU Module(1) On/Off Button can be used, for example, when the room temperature is too low, by simply turning off the Central ECU Module(1) manually, to delay and/or prevent the operation of the system and favor the heating of the brakes and tires in this type of condition, thus preventing their freezing.

The ECU Module of the Vehicle(13) transmits to the Central ECU Module(1) the parameters of the vehicle's original TPMS, via the CAN BUS J1939 network, providing information on tire pressure and temperature, speed, activation of brake lights and the operation of brake lights. The Central ECU Module(1) receives and parameterizes such information to define the operating mode, duration and potency of the Fan(s)(6).

The system can be connected to a TPMS Module(2) other than the vehicle's original one, reading the tire's pressure and temperature parameters, informing the Central ECU Module(1), which receives and parameterizes such information to set the mode, duration, and operating potency of the Fan(s)(6).

Regarding the Accelerometer, it informs the variations of G forces in braking, curves and accelerations in the three axes (X, Y, and Z), to the Central ECU Module(1), which receives and parameterizes such information to define the mode, duration, and operating potency of the Fan(s)(6).

Regarding the Inclinometer, it informs the vehicle's horizontal or vertical inclination parameters, which allows the system to check whether the vehicle is going uphill or downhill, to the Central ECU Module(1), which receives and parameterizes such information to set the operating mode, duration and potency of the Fan(s)(6).

The Fan(s)(6), in addition to receiving commands from the Central ECU Module(1) regarding its activation and operation mode (speed and duration), also send information about its own functioning to the Central ECU Module(1), such as consumption, RPM and speed parameters. Such information is also parameterized by the Central ECU Module(1) to define the operating mode, duration and potency of the Fan(s)(6).

The Air inlet ducts(8) and the external air catchers(7) may or may not be used by the system; its use allows air with a lower temperature to be collected by the system, especially in vehicles that have closed sides, further optimizing its operation and cooling power.

The cold air inlet flanges(9), located on the hub's backplate when the brake is by drum or on the wheel's hub when the brake is by disc, allows directing the cold air channeled and blown by the Fan(s)(6), through forced air outlet ducts (12), directly to each hub/shoe or brake disc/pad, increasing its lifespan, preserving tires and bearings and further optimizing the cooling system.

The hot air outlet flange(10) is located on the hub's backplate when the brake is by drum or on the wheel's hub when the brake is by disc, allowing the removal of part of the heat dissipated by the system and releasing the air flow from the Fan(s)(6). The absence of this component leads to a reduction in the efficiency of the system, due to a drop in the efficiency of the Fan(s)(6), by restricting and strangling the air flow.

The Central ECU Module(1) parameterizes the information received from the system components through its own algorithm, observing the following parameters that affect the system activation, the stage (speed) of the fans and the activation duration:

Vehicle ignition key: key position (vehicle on or off);
Vehicle battery: if allowed to turn on the system and in which mode; and when to turn off the system;
Room Temperature (via Central ECU Module or ECU Module of the Vehicle): turns the system on or off and compensates the Fan(s) activation time by temperature;
Tire's Temperature and Pressure, through the TPMS Module or the ECU Module of the Vehicle: the system is turned on or off and compensates the Fan(s) activation time by the tire's temperature;
Stoplights/Brake Light (braking counter and braking time): counts and compensates vehicle's brake activations, in order to compensate for continuous or excessive activations; it also allows delaying the start of system operation in order to allow a pre-heating of the brake system at the start of operation;
Accelerometer (G-force): compensation of the Fan(s) activation duration based on the measured G-force;
Inclinometer (vehicle going uphill or downhill): counts and compensates for uphill and downhill time; and indicates the operating duration and on which axle the system will act.

The system also allows its operation even when the vehicle is turned off. The Central ECU Module(1) detects the status of the vehicle's ignition key(3) and the level of the vehicle's Battery(5), so as to check whether it is on or off.

If it is detected that the vehicle has been turned off, the system will work in order to cool the brakes until the battery reaches a predetermined minimum operating voltage or for a predetermined time, without compromising the vehicle's load and starting capacity, through the battery's management logic contained in the Central ECU Module(1).

The invention claimed is:

1. A centralized cooling system for vehicle brakes wheels, tires, and bearings, comprising:
   a Central ECU Module, which controls the functioning of the centralized cooling system;
   at least one fan fixed to the vehicle, connected, through a forced air outlet, to a cold air inlet flange, in turn connected to a drum or brake disc of the vehicle; and
   at least one hot air outlet flange connected to the drum or brake disc of the vehicle, allowing the removal of part of the heat dissipated by the system and releasing fan air flow, wherein the system allows operation with the vehicle turned off, through power supplied by a vehicle battery, until it reaches a predetermined minimum voltage or for a predetermined time.

2. The system, according to claim 1, wherein a plurality of fans, ducts, and cold air inlet flanges are connected to each drum or brake disc of the vehicle.

3. The system, according to claim 1, wherein the at least one fan is connected to at least one external air catcher, through an air inlet duct.

4. The system, according to claim 1, wherein the fan is of a brushless type, with an IP69 protection system and current control by RPM.

5. The system, according to claim 1, wherein the Central ECU Module controls activation of at least one system fan, according to information collected, received, and processed, from the vehicle's peripheral components.

6. The system, according to claim 5, wherein the Central ECU Module has a manual switch to activate or deactivate the system.

7. The system, according to claim 5, wherein mandatory peripheral components for operation of the system comprise the vehicle battery and at least one alternator.

8. The system, according to claim 7, wherein the system is further configured to collect information on a voltage and a current of the vehicle battery, and whether the vehicle is on or off, changing operation and speed of the at least one fan based on such information, thereby allowing the system to work even when the vehicle is turned off.

9. The system, according to claim 5, wherein one component that provides information to the Central ECU Module is the vehicle's brake lights, in order to check whether the vehicle is on or off, a duration of activation of the brakes, and a number of brakings applied over time, changing operation and the at least one fan speed based on such information.

10. The system, according to claim 5, wherein one component that provides information to the Central ECU Module is the vehicle's ignition key, in order to check and confirm whether the vehicle is turned on or off, changing operation and the at least one fan speed based on such information and allowing the system to function even when the vehicle is powered off via battery power of the vehicle.

11. The system, according to claim 5, wherein one component that provides information to the Central ECU Module is the ECU Module of the vehicle, through a CAN BUS Network J1939, in order to allow the system to collect information from an original tire pressure monitoring system (TPMS) of the vehicle.

12. The system, according to claim 5, wherein one component that provides information to the Central ECU Module is a tire pressure monitoring system (TPMS) Module, in order to allow the system to collect tire temperature information, changing operation and speed of the at least one fan based on such information.

13. The system, according to claim 5, wherein one component that provides information to the Central ECU Module is an Accelerometer, in order to allow the system to detect, identify and quantify G forces in brakings, curves and accelerations in three axes (X, Y, and Z), changing the at least one fan operation based on such information.

14. The system, according to claim 5, wherein one component that provides information to the Central ECU Module is an Inclinometer, in order to allow the system to detect whether the vehicle is on an ascent or a descent, changing operation of the at least one fan based on such information.

15. A centralized cooling system for vehicle brakes, wheels, tires, and bearings comprising:
   a) a Central ECU Module, which controls operation of the system, parameterizing mode, time and operating power of at least one fan, through information collected, received, and processed from peripheral components comprising:
      i) a tire pressure monitoring system (TPMS) module;
      ii) a vehicle ignition key;
      iii) signal/brake lights;
      iv) a battery of the vehicle;
      v) a ECU Module of the vehicle;
      vi) an accelerometer;
      vii) an inclinometer;
      viii) an alternator;
      ix) a Central ECU Module on/off button;

b) the at least one fan fixed to the vehicle, connected, through a forced air outlet, to at least one cold air inlet flange, which in turn is connected to a drum or brake disc of the vehicle;
c) at least one hot air outlet flange connected to the drum or brake disc of the vehicle, allowing for removal of heat dissipated by the system and releasing the at least one fan's air flow;
d) at least one external air catcher, connected via an air inlet duct, to the at least one fan;
wherein the Central ECU Module controls activation of the at least one fan, according to information collected, received, and processed, from the vehicle's peripheral components, wherein one component that provides information to the Central ECU Module is the vehicle's ignition key, in order to check and confirm whether the vehicle is turned on or off, changing operation and the at least one fan speed based on such information and allowing the system to function even when the vehicle is powered off via battery power of the vehicle.

\* \* \* \* \*